No. 848,052. PATENTED MAR. 26, 1907.
W. SCHENK.
MILLING MACHINE.
APPLICATION FILED NOV. 17, 1906.
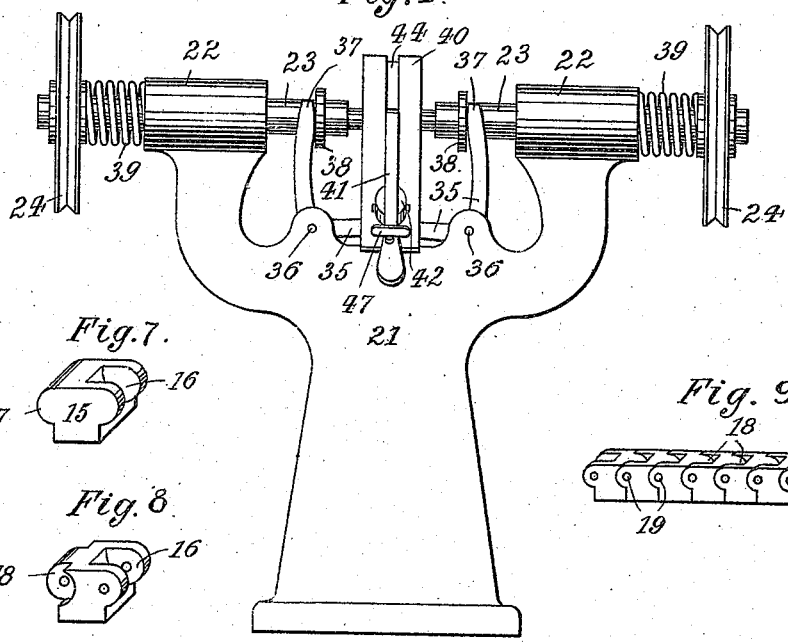
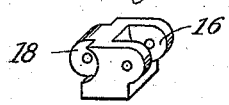
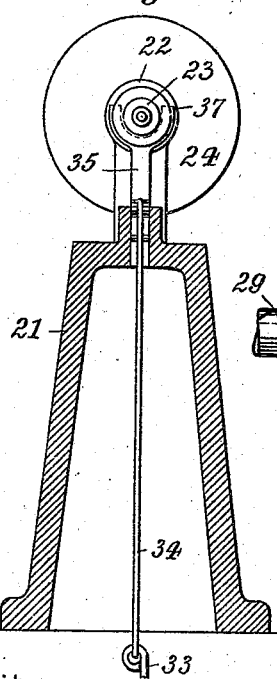
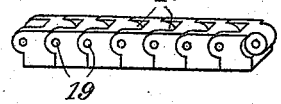
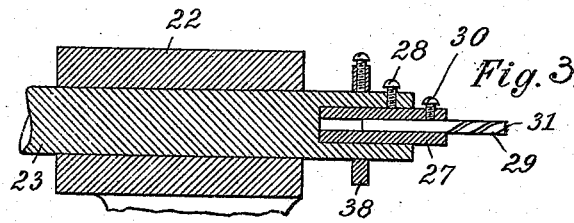
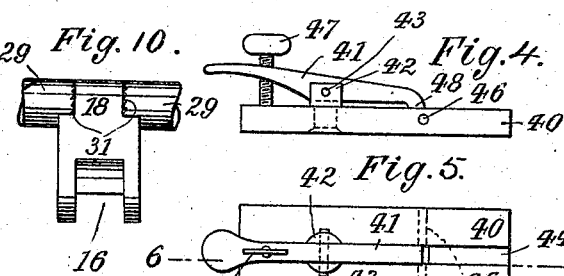
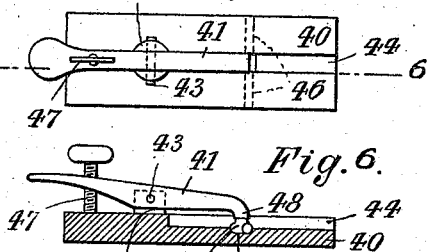
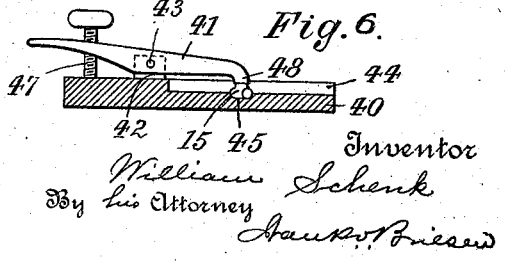
Witnesses
Arthur Jumpe
William Schulz
Inventor
William Schenk
By his Attorney

UNITED STATES PATENT OFFICE.

WILLIAM SCHENK, OF JERSEY CITY, NEW JERSEY.

MILLING-MACHINE.

No. 848,052.　　　　Specification of Letters Patent.　　　Patented March 26, 1907.

Application filed November 17, 1906. Serial No. 343,809.

*To all whom it may concern:*

Be it known that I, WILLIAM SCHENK, a citizen of the United States, residing at Jersey City, Hudson county, State of New Jersey, have invented new and useful Improvements in Milling-Machines, of which the following is a specification.

This invention relates to a milling-machine for forming the knuckles or male members of flat chain-links.

The machine is particularly designed for the manufacture of jewelry-chains, jointed bracelets, and similar articles, and permits the knuckles to be quickly and accurately shaped without the employment of skilled labor.

In the accompanying drawings, Figure 1 is a front elevation of a milling-machine head embodying my invention; Fig. 2, a vertical transverse central section thereof with the work-holder omitted; Fig. 3, a detail of one of the tool-spindles; Fig. 4, a side view of the work-holder; Fig. 5, a plan thereof; Fig. 6, a section on line 6 6, Fig. 5; Fig. 7, a perspective view of the blank to be shaped; Fig. 8, a perspective view of the completed chain-link; Fig. 9, a similar view of the chain, and Fig. 10 a detail showing the engagement of the milling-tools with the work-piece.

The blank 15 to be shaped is provided at one end with a groove 16 and at the other end with a bead 17, Fig. 7.

The machine which forms the subject of this invention reduces the bead 17 uniformly at both sides to transform it into a knuckle 18, the knuckle of one link being adapted to to be received by the groove of the adjoining link. In the completed chain, Fig. 9, adjoining links are connected by pivots 19.

The machine-head 21 is provided with a pair of spaced and axially-opposed tubular bearings 22. Each of these bearings receives a rotatable and axially-movable spindle 23, carrying a pulley 24. The pulleys 24 of the two spindles 23 are simultaneously rotated in opposite directions by suitable belting. A socket formed on the inner end of each spindle 23 receives an outwardly-extending tubular sleeve 27, held to the spindle by a set-screw 28. Sleeve 27 in turn receives the outwardly-extending milling-tool 29, held thereto by a set-screw 30. By the means described sleeve 27, as well as milling-tool 29, may be readily adjusted in an axial direction to set the machine to the particular work desired, while, furthermore, the sleeve may be readily removed and replaced by one having a different bore to accommodate milling-tools of different diameters.

Milling-tool 29 is provided with crown or face teeth 31 and corresponds in diameter to that of bead 17 to be reduced.

Spindles 23 may be simultaneously advanced toward each other by means of a treadle connected by interlinked wires 33 34 to a pair of elbow-levers 35, pivoted to head 21 at 36. The forked upper end 37 of each lever 35 grasps the inner exposed end of spindle 23 back of a collar 38, fast on said spindle. A pressure on the treadle will draw both spindles 23 inward, while when such pressure is released they will be retracted by springs 39.

The work-holder coöperating with the above machine is composed, essentially, of a base-plate 40 and of a dog or hand-lever 41, fulcrumed to lugs 42 of said plate at 43. Plate 40 constitutes the relatively fixed member of a clamp of which dog 41 is the movable member. A central longitudinal groove 44 of plate 40 is provided with a depression or recess 45, profiled to seat blank 15. At right angles to groove 44 extends through plate 40, at each side of such recess, a bore 46, which opens into the recess and is alined with bead 17 of the seated blank. The diameter of bore 46 is such that it will snugly accommodate milling-tool 29, but will not receive sleeve 27, the latter being of greater diameter than the bore. Dog 41 is tapped for the reception of a clamp-screw 47, by which it may be readily opened or closed, the jaw 48 of the dog bearing in its closed position upon blank 15, seated in recess 45.

In use the blank 15 is secured to the work-holder, and the latter is held between the rotating milling-tools 29 in such a way that the bore 46 of the work-holder becomes alined with tools 29. A pressure on the treadle will now advance such tools so that they will enter bores 46 and remove the desired quantity of metal from each side of bead 17. When the exposed ends of sleeves 27 strike the sides of plate 40, they will constitute stops and prevent the further advance of the tools. After the blank has been shaped in the manner described pressure on the treadle is released, so that spindles 23 will be retracted by their springs 39 and the shaped link may be removed from the work-holder.

It will be seen that the machine provides means for automatically regulating the quantity of metal cut away from the sides of bead 17, so that uniformity in the width of the shaped knuckles is insured. So, also, by adjusting the length of the protruding ends of the milling-tools the amount of metal removed may be varied and the machine thus set to shape knuckles of different thicknesses.

I claim—

1. In a milling-machine, a work-holder composed of a fixed jaw having a recess and a pair of perforations opening into said recess, and of a coöperating movable jaw, substantially as specified.

2. In a milling-machine, a work-holder composed of a fixed jaw having a recessed longitudinal groove and a pair of perforations opening into the recess of said groove, and of a coöperating movable jaw, substantially as specified.

3. In a milling-machine, a pair of opposed rotatable spindles and milling-tools secured thereto, combined with a work-holder having a seat for the blank, a pair of alined perforations adapted to receive the milling-tools, and means for limiting the advance of said tools within said perforations, substantially as specified.

Signed by me at New York city, Manhattan, New York, this 15th day of November, 1906.

WILLIAM SCHENK.

Witnesses:
    EMIL SENIUS,
    KARL KOCH.